United States Patent
Moetakef

(10) Patent No.: US 9,212,662 B2
(45) Date of Patent: Dec. 15, 2015

(54) CHECK VALVE FOR AN ENGINE VACUUM PUMP

(71) Applicant: Ford Global Technologies, LLC, Dearborn, MI (US)

(72) Inventor: Mohammad Ali Moetakef, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 13/872,738

(22) Filed: Apr. 29, 2013

(65) Prior Publication Data

US 2014/0322061 A1    Oct. 30, 2014

(51) Int. Cl.
| | |
|---|---|
| *F01C 21/10* | (2006.01) |
| *F03C 2/00* | (2006.01) |
| *F03C 4/00* | (2006.01) |
| *F04C 2/00* | (2006.01) |
| *F04C 29/12* | (2006.01) |
| *F16K 15/02* | (2006.01) |
| *F04C 25/02* | (2006.01) |
| *F04C 18/344* | (2006.01) |

(52) U.S. Cl.
CPC ........... *F04C 29/128* (2013.01); *F04C 18/3442* (2013.01); *F04C 25/02* (2013.01); *F04C 29/126* (2013.01); *F16K 15/026* (2013.01); *Y10T 137/7925* (2015.04)

(58) Field of Classification Search
USPC ....................... 137/538, 535, 544, 625.3, 540; 251/121, 126, 335.1–335.3; 210/136, 210/418; 55/503; 385.3
See application file for complete search history.

(56) References Cited

U.S. PATENT DOCUMENTS

| | | | | | |
|---|---|---|---|---|---|
| 2,487,449 | A | * | 11/1949 | Knudson | 418/152 |
| 2,537,051 | A | * | 1/1951 | Grant, Jr. | 251/276 |
| 2,612,728 | A | * | 10/1952 | Jacobsson | 137/505.42 |
| 3,631,891 | A | * | 1/1972 | Brumm | 137/625.3 |
| 3,693,659 | A | * | 9/1972 | Parola | 137/625.3 |
| 3,705,278 | A | * | 12/1972 | Scott | 137/624.17 |
| 3,901,342 | A | * | 8/1975 | Nunn, Jr. | 180/407 |
| 4,575,322 | A | * | 3/1986 | Paquet et al. | 418/96 |
| 5,161,576 | A | | 11/1992 | Hekkert et al. | |
| 6,187,182 | B1 | * | 2/2001 | Reynolds et al. | 210/136 |
| 6,763,797 | B1 | | 7/2004 | Staley et al. | |
| 6,790,019 | B1 | | 9/2004 | Hinchey, Jr. | |
| 2009/0266441 | A1 | * | 10/2009 | Sato | 141/63 |

(Continued)

FOREIGN PATENT DOCUMENTS

| | | |
|---|---|---|
| EP | 1972785 A1 | 9/2008 |
| JP | 62288787 A | 12/1987 |
| JP | 6331048 A | 11/1994 |

OTHER PUBLICATIONS

WABCO Vehicle Control Systems. "Vacuum Pumps for Diesel and Gasoline Engines". American Standard Companies, Inc. Copyright 2004.

*Primary Examiner* — Theresa Trieu

(74) *Attorney, Agent, or Firm* — Greg P. Brown; Price Heneveld LLP

(57) ABSTRACT

A rotary vane pump includes a housing that encloses an air chamber. An intake aperture extends to the air chamber. A check valve couples with the intake aperture and includes a stop having first and second sides. A helical spring engages the first side and biases the second side against a valve seat. A porous body is disposed between the helical spring and the air chamber for preventing fluid backflow.

13 Claims, 5 Drawing Sheets

(56) References Cited

U.S. PATENT DOCUMENTS

| | | | |
|---|---|---|---|
| 2010/0000207 A1* | 1/2010 | Heaps et al. | 418/15 |
| 2010/0028189 A1* | 2/2010 | Cadeddu | 418/259 |
| 2010/0092323 A1* | 4/2010 | Ohtahara et al. | 418/83 |
| 2010/0158704 A1* | 6/2010 | Charlton et al. | 137/538 |
| 2011/0064598 A1* | 3/2011 | Kishi et al. | 418/173 |
| 2011/0129367 A1 | 6/2011 | Han et al. | |

\* cited by examiner

US 9,212,662 B2

CHECK VALVE FOR AN ENGINE VACUUM PUMP

FIELD OF THE INVENTION

The present invention generally relates to a vacuum pump, and more specifically to a check valve for a rotary vane pump used with a vehicle brake booster.

BACKGROUND OF THE INVENTION

It is becoming increasingly more common for vehicles to include a brake booster in vehicle braking systems for reducing the amount of pedal pressure needed to apply brakes, particularly with respect to vehicles having disk brakes. It is generally understood that a brake booster employs a vacuum to multiply the force that the pedal applies to a master cylinder, allowing a driver to more easily engage the brakes and reduce the speed of the vehicle. In some brake systems, such as in vehicles operated with diesel engines and electrical motors, the brake booster may employ an independent vacuum pump to provide the vacuum to the master cylinder. These vacuum pumps occasionally generate loud noise and contain lubrication that may backflow to the master cylinder. This backflow may deteriorate the elastomeric components within the brake booster and components leading to the brake booster, which in addition to potentially compromising the effectiveness of the brake system, may also generate additional noise.

SUMMARY OF THE INVENTION

According to one aspect of the present invention, a rotary vane pump includes a housing that encloses an air chamber. An intake aperture extends to the air chamber. A check valve couples with the intake aperture and includes a stop having first and second sides. A helical spring engages the first side of the stop and biases the second side of the stop against a valve seat. A porous body is disposed between the helical spring and the air chamber for preventing fluid backflow.

According to another aspect of the present invention, a rotary vane pump for a vehicle brake booster includes a housing enclosing a cylindrical chamber. An intake aperture extends to the cylindrical chamber for delivering an air flow. A check valve is disposed within the intake aperture and includes an elastomeric stop moveable between open and closed positions. A spring biases the elastomeric stop in the closed position away from the cylindrical chamber and against a valve seat to restrict the air flow. A porous body is disposed between the spring and the cylindrical chamber for preventing fluid backflow from migrating from the cylindrical chamber to the elastomeric stop.

According to another aspect of the present invention, a check valve for an intake aperture of a vacuum pump includes a stop movable between a closed position that obstructs the intake aperture and an open position that allows air flow to the vacuum pump. A porous body is proximate the intake aperture for preventing fluid backflow to the stop. A compression spring is coupled between the stop and the porous body for biasing the stop in the closed position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
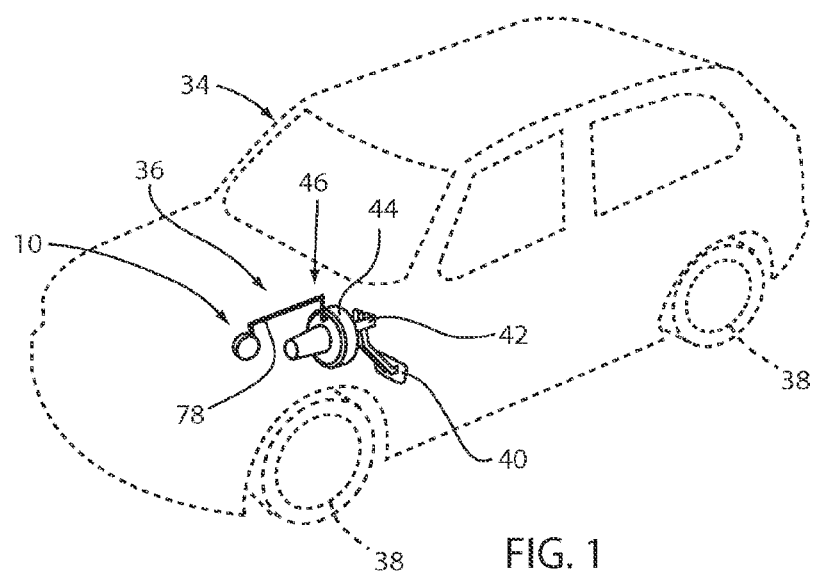
FIG. 1 is a top perspective view of a vehicle including a brake booster and a vacuum pump.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-9, reference numeral 10 generally designates a rotary vane pump, which includes a housing 12 that encloses an air chamber 14. An intake aperture 16 extends to the air chamber 14. A check valve 18 couples with the intake aperture 16 and includes a stop 20 having a first side 22 and a second side 24. A helical spring 26 engages the first side 22 and biases the second side 24 against a valve seat 28. A porous body 30 is disposed between the helical spring 26 and the air chamber 14 for preventing fluid backflow 32.

Referring now to FIG. 1, a passenger vehicle 34 is shown having a brake system 36 for reducing rotation of at least one wheel 38 of the vehicle 34. The illustrated brake system 36 includes a pedal 40 positioned proximate a driver of the vehicle 34, such that the driver may move the pedal 40 forward for engaging the brakes. The pedal 40 is coupled with a shaft 42 that extends within a master cylinder 44 of a brake booster 46. The master cylinder 44 generally includes two pressure chambers divided by a diaphragm. A low pressure chamber of the master cylinder 44 is configured to retain a low atmospheric pressure prior to actuating the brake pedal 40. Upon actuation of the brake pedal 40, the shaft 42 drives the diaphragm forward causing a high pressure chamber within the master cylinder 44 to fill with air having a higher atmospheric pressure than the low pressure chamber, which results in a lesser force required to move the shaft 42 forward, and thereby, a lesser force to apply the brakes. The low air pressure retained in the low pressure chamber of the master cylinder 44 is generated in the illustrated embodiment, by the vacuum pump 10. With respect to the illustrated embodiment, the vacuum pump 10 is a rotary vane pump 10. However, it is conceivable that the vacuum pump 10 may be an alternative type of pump. In addition, it is contemplated that such a rotary vane pump 10 may be otherwise employed for alternative uses, such as with alternative engine components of the vehicle 34. It is further contemplated that the vehicle 34 may include other vehicle types, such as, commercial trucks, sport utility vehicles, and other vehicles as generally understood by one having ordinary skill in the art.

Figure 2:
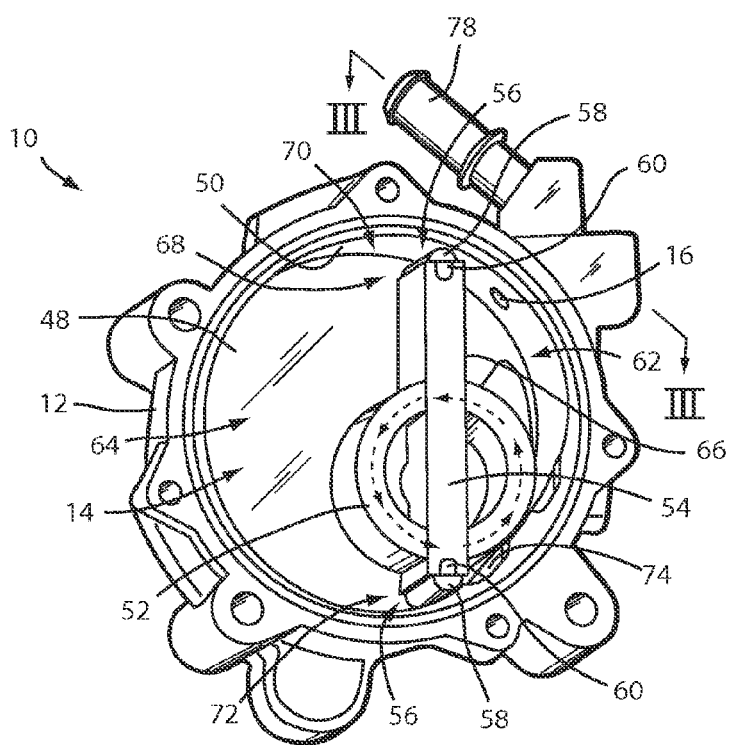
FIG. 2 is a bottom perspective view of the vacuum pump, showing an exposed portion of a cylindrical chamber.

As illustrated in FIG. 2, one embodiment of the rotary vane pump 10 is illustrated with a portion of the housing 12 removed to expose the cylindrical air chamber 14 therein. The cylindrical air chamber 14 accordingly, is defined by a first wall 48, a second wall (not shown), and a circular interior diameter 50. The interior diameter 50 has a generally consistent sidewall surrounding a rotor 52 that is eccentrically coupled within the cylindrical air chamber 14. In the illustrated embodiment, the rotor 52 includes a single vane 54 slideably coupled with and extending through the rotor 52 to engage opposing points on the interior diameter 50. The vane 54 is generally linear, although alternative shapes of the vane are conceivable. The distal ends of the vane 54 that contact two points on the interior diameter 50 each have a floating tip 56 that sealably couples with the interior diameter 50. As such, the floating tips 56 are comprised of a rounded portion 58 that sealably abuts the interior diameter 50 and an inward extending portion 60 that couples with the vane 54 and is biased radially outward to maintain a consistent sealed contact with the interior diameter 50 upon rotation of the rotor 52. The vane 54 also provides a sealed interface between the first and second walls, such that the vane 54 divides the cylindrical air chamber 14 into a first pressure compartment 62 and a second pressure compartment 64, each pressure compartment sealed from the other. As generally understood in the art, it is conceivable that alternative vacuum pump arrangements are contemplated including multiple and alternatively arranged vanes that may provide additional pressure compartments.

Still referring to FIG. 2, the intake aperture 16 is disposed on the interior diameter 50 and generally extends from the interior diameter 50 outward from the air chamber 14. As shown, the first pressure compartment 62 is defined between the intake aperture 16 and a single side 66 of the vane 54. Upon rotation of the rotor 52 in the illustrated direction, the vane 54 slides upward within the rotor 52 and the floating tip 56 proximate a first end 68 of the vane extends to maintain a sealed connection with an upper portion 70 of the interior diameter 50, such that the first pressure compartment 62 expands to draw air into the air chamber 14 of the vacuum pump from the intake aperture 16. Continued rotation of the rotor 52 moves a second end 72 of the vane 54 beyond the intake aperture 16 to capture the air in the first pressure compartment 62 and compress the air before it is dispensed from an exhaust aperture 74, along with any lubricating fluid. As the first pressure compartment 62 exhausts air the second pressure compartment 64 is receiving air from the intake aperture 16, such that the rotation of the rotor 52 creates a generally consistent flow of air into the vacuum pump 10 from the brake booster 46, as generally understood in the art. It is also understood that the rotor 52 may be rotated by an independent electrical motor, the cam shaft, or other means as generally understood in the art.

Figure 3:
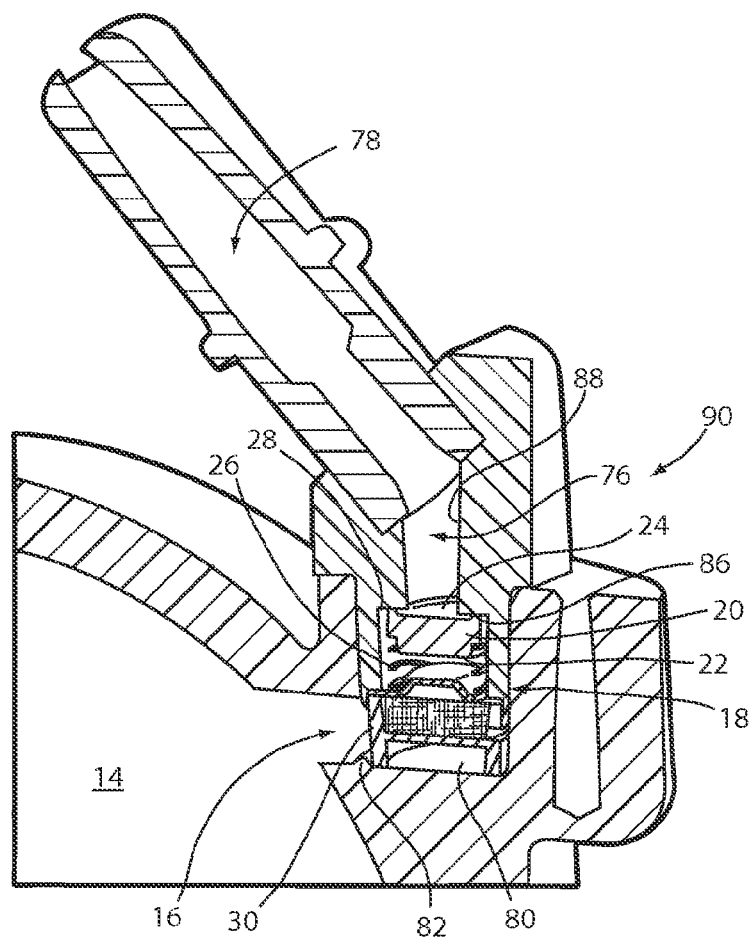
FIG. 3 is a cross-sectional top perspective view of an intake aperture that extends into the cylindrical chamber and a check valve disposed within the intake aperture.

As illustrated in FIG. 3, the intake aperture 16 extends outward from the air chamber 14 to connect with a conduit 76 that extends orthogonally from the intake aperture 16 to define an L-shape. The conduit 76 extends to connect to an air line 78 that leads to the low pressure chamber of the brake booster 46 (FIG. 1). The check valve 18 is disposed within the intake aperture 16 and generally positioned between the intake aperture 16 and the air line 78. More specifically, the porous body 30 of the check valve 18 occupies the right angle and connection between the intake aperture 16 and the conduit 76. The intake aperture 16 includes a circular base surface 80 proximate the conduit 76 that supports the porous body 30. A retention ridge 82 extends upward from the base surface 80 outside the porous body 30 proximate the air chamber 14. The check valve 18 extends upward from the porous body 30 within the conduit 76 and terminates at the valve seat 28. The valve seat 28 protrudes inward toward a central axis of the conduit 76 to define a retention surface 86 generally orthogonal to an interior surface 88 of the conduit 76 and surrounding the diameter of the conduit 76. Accordingly, the elastomeric stop 20 of the check valve 18 abuts the retention surface 86 of the valve seat 28 to place the stop 20 in a closed position 90, which provides a seal between the air line 78 and the intake aperture 16 for preventing passage of air or fluid. The helical spring 26 engages a first side 22 of the stop 20 and biases a second side 24 of the stop 20 against the valve seat 28 in the closed position 90. It is contemplated that the angle between the inlet aperture and the conduit 76 may include various alternative angles including a direct alignment of the inlet aperture and the conduit 76. It is further contemplated that the valve seat 28 may be alternatively arranged to protrude inward at other various angles or configurations to maintain a seal with the stop 20 in the closed position 90.

Figure 4:
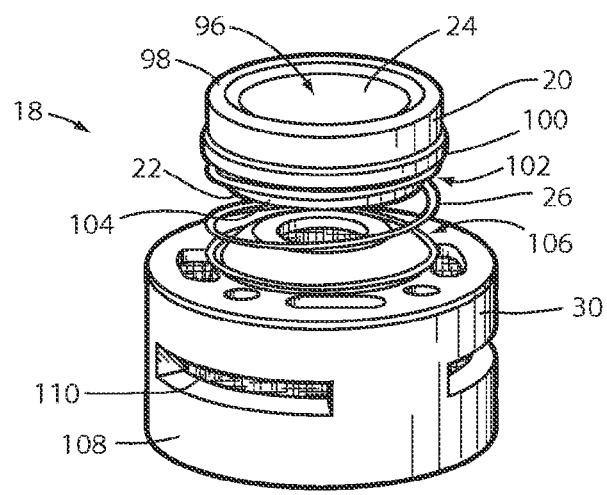
FIG. 4 is a top perspective view of one embodiment of the check valve.
Figure 5:
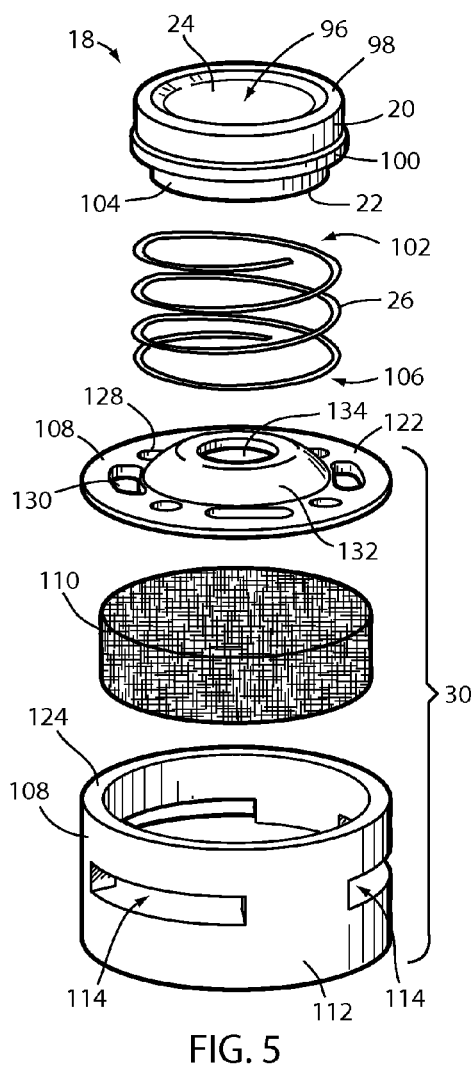
FIG. 5 is an exploded top perspective view of one embodiment of the check valve.
Figure 6:
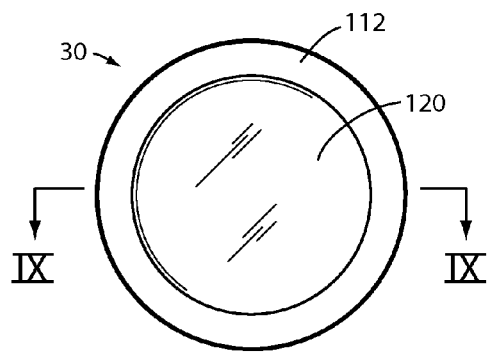
FIG. 6 is a bottom plan view of the check valve, as shown in FIG. 4.

Referring now to FIGS. 4-5, the check valve 18 is shown with the stop 20, the spring 26, and the porous body 30, all having a generally cylindrical shape to conform to the cylindrical shape of the intake aperture 16 and the conduit 76 extending away from the air chamber 14 of the vacuum pump 10 (FIG. 1). However, it is conceivable that the general shape of the check valve 18 may be modified to accommodate an alternatively shaped conduit 76 and intake aperture 16. In the illustrated embodiment, the second side 24 of the elastomeric stop 20 has a concave surface 96 defined by an upward protruding edge 98 around the periphery of the stop 20; although, a convex surface may be employed in alternative embodiments. The first side 22 of the stop 20 includes a collar 100 extending radially outward to provide a surface to engage an upper portion 102 of the helical spring 26. The spring 26 is sized to generally secure around the periphery of the first side 22 of the stop 20 and to engage the collar 100, with a central portion 104 of the first side 22 extending slightly within the interior area of the spring 26. The helical spring 26 has a generally consistent diameter extending between the upper portion 102 and a lower portion 106 that engages the porous body 30. It is, however, contemplated that the stop 20 and the spring 26 may be alternatively configured, such as providing a spring with a tapered diameter, alternative shape, or a different type of compression spring, as generally understood by one having ordinary skill in the art. The stop 20 may also conceivably comprise alternative materials from an elastomer, such as a polymer or metal material.

Figure 7:
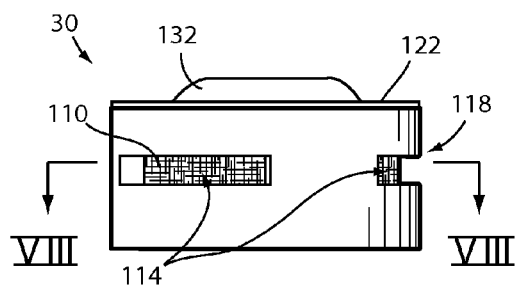
FIG. 7 is a side elevational view of a porous body of the check valve shown in FIG. 4.
Figure 8:
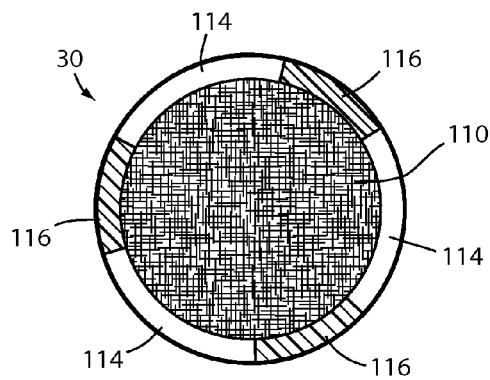
FIG. 8 is a cross-sectional view of the porous body, taken at line VIII of FIG. 7.
Figure 10:
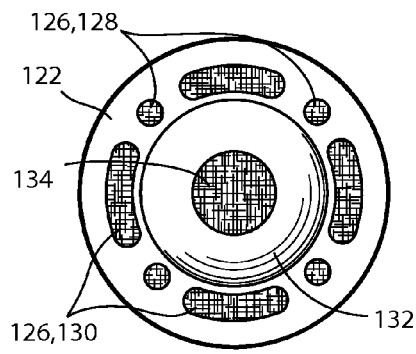
FIG. 10 is a top plan view of the porous body.
Figure 9:
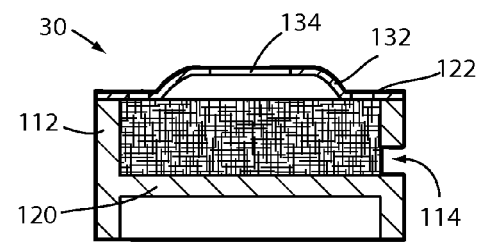
FIG. 9 is a cross-sectional view of the porous body, taken at line IX of FIG. 6.

As shown in FIGS. 5-9, the porous body 30 of the check valve 18 includes a structural frame 108 that rigidly supports the spring 26 for biasing the stop 20 against the valve seat 28. The structural frame 108 generally surrounds a piece of metal foam 110 configured to allow air flow to enter the air chamber 14 and to prevent fluid from migrating to the stop 20. The structural frame 108 includes a sidewall 112 having a tubular shape and three slot-shaped side openings 114 spaced in horizontal alignment around the sidewall 112. As illustrated in FIG. 8, the side openings 114 are equally spaced around the circumference of the sidewall 112 to define support members 116 therebetween that have an arcuate shape following the curvature of the sidewall 112. The side openings 114, as shown in FIG. 7, are disposed at an intermediate longitudinal portion 118 of the sidewall 112, generally between the base surface 80 (FIG. 3) and the lower portion 106 of the spring. Below the side openings 114, as illustrated in FIG. 9, a partition plate 120 divides the interior volume of the structural frame 108 and provides a surface to support the metal foam 110 above the base surface 80 (FIG. 3). The partition plate 120 extends generally horizontally and continuously across the diameter of the sidewall 112. Conceivably, the side openings 114 may have various shapes, quantities, and disbursement patterns on the sidewall 112 in other embodiments.

With further reference to FIGS. 5-10, the structural frame 108 also includes a cover member 122 that is coupled with a top edge 124 of the sidewall 112 and sealably engaged with the top edge 124 around the circumference of the sidewall 112. The cover member 122 includes a series of top openings 126 extending through the top member to the central area of the porous body 30 that is occupied, in the illustrated embodiment, by the metal foam 110. The top openings 126 comprise four small circular apertures 128 dispersed between four oblong apertures 130 equally spaced around a raised portion 132 of the cover member 122. The raised portion 132 has a large circular aperture 134 centered on the cover member 122 and is configured to reside within the diameter of the helical spring 26. The side openings 114 and the top openings 126 of the structural frame 108 together allow air to flow from the brake booster 46 to the air chamber 14 of the vacuum pump 10 (FIG. 1), forcing the air to flow through the metal foam 110 contained within the structural frame 108. Yet again, the top openings 126 may conceivably include various shapes, quantities, and disbursement patterns on the cover member 122 in other embodiments.

The metal foam 110 shown in the illustrated embodiment of FIGS. 5-10 is contained within the structural frame 108 of the porous body 30. This piece of metal foam 110 has a cylindrical shape to occupy the interior volume surrounded by the sidewall 112 and contained between the cover member 122 and the partition plate 120. The metal foam 110 generally has an open-cell construction to allow air to easily pass through the openings therein and to restrict liquid flow through the porous body 30 due to surface tension of the liquid. Further, the metal foam 110 typically comprises an aluminum material; however, it is contemplated that the metal foam 110 may additionally or alternatively include other lightweight metals. It is also conceivable that the metal foam 110 may be supplemented with or replaced with an alternative material having a similar open-cell construction or a combination of materials that together have high porosity for air flow and a tendency to retain or restrict the flow of liquids. For instance, the metal foam 110 may be replaced with a porous carbon-based substrate or other similar materials as generally understood in the art.

Figure 11:
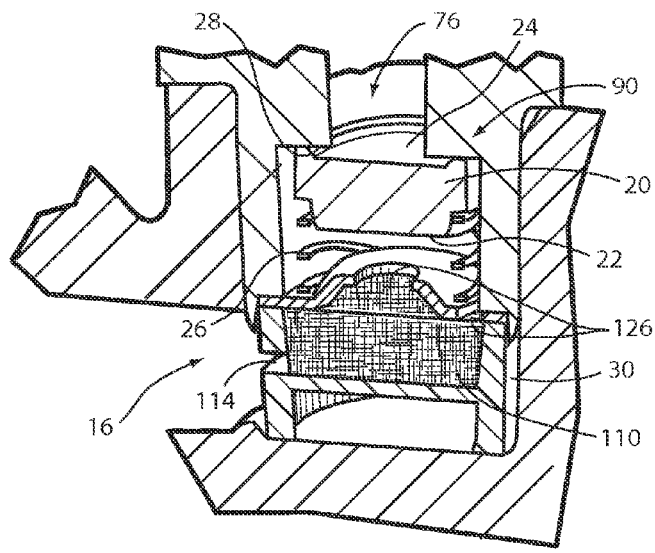
FIG. 11 is a cross-sectional top perspective view of the check valve, having an elastomeric stop in a closed position.
Figure 12:
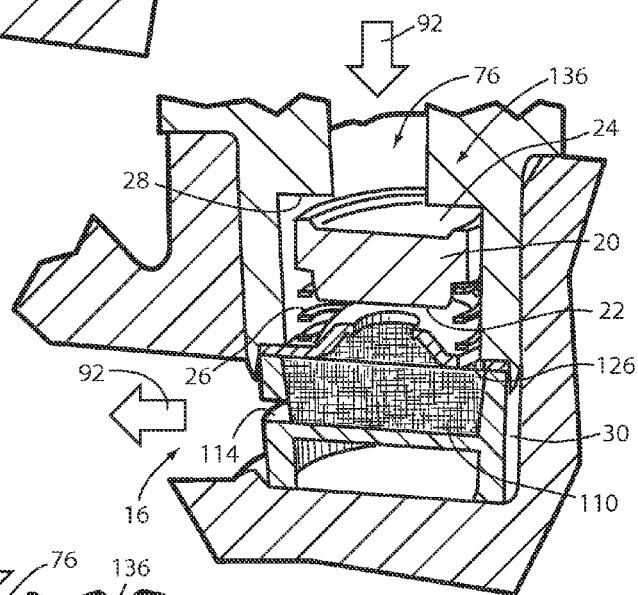
FIG. 12 is a cross-sectional top perspective view of the check valve, showing the elastomeric stop in an open position and an airflow entering an air chamber through the intake aperture.

Referring now to FIGS. 11-12, rotation of the rotor 52 of the vacuum pump 10, as described above, causes low pressure within the intake aperture 16. Upon reaching a threshold level of low air pressure on the first side 22 of the stop 20, the second side 24 of the stop 20 is caused to move out of engagement with the valve seat 28 and thereby compresses the spring 26 between the stop 20 and the porous body 30 to allow air to flow into the air chamber 14 of the vacuum pump 10. More specifically, the stop 20 moves from the closed position 90 to an open position 136, shown in FIG. 12, away from at least a portion of the valve seat 28. In the open position 136, air flow 92 is drawn from the air line 78 (FIG. 3) and the conduit 76 and past the spring 26 to enter the air chamber 14 by passing consecutively through the top openings 126, the metal foam 110, and the side openings 114 of the porous body 30. This buffers some of the intake air flow and thereby reduces noise caused by the intake air flow.

Figure 13:
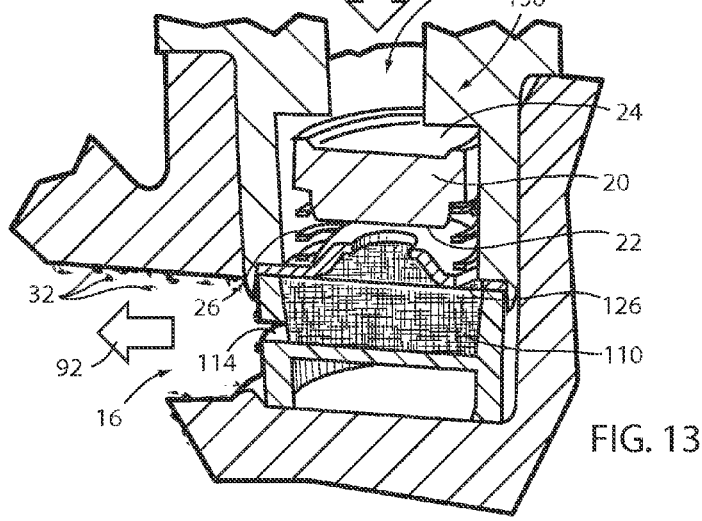
FIG. 13 is a cross-sectional top perspective view of the check valve having the elastomeric stop in the open position and a fluid migrating against the porous body.

Furthermore, as illustrated in FIG. 13, as the rotor 52 continues to rotate, lubrication fluid for the vane and rotor 52, such as oil, is agitated within the air chamber 14 and migrates into and along the sides of the intake aperture 16 in a reverse direction from air flow, shown as the fluid backflow 32 entering the intake aperture 16. The sidewall 112 of the porous body 30 initially restricts the fluid backflow 32 from entering the conduit 76, requiring the fluid backflow 32 to migrate a greater distance through the side openings. If the fluid backflow 32 is not restricted by the sidewalls 112, the fluid backflow 32 will enter the side openings and attempt to migrate through the metal foam 110; however, the metal foam 110 will restrict the fluid backflow 32 from further migrating and greatly reduce the chances of the fluid backflow 32 reaching the elastomeric stop 20, air line 78, and brake booster 46 (FIG. 1), which has been discovered to deteriorate these components and cause noise and inefficiency of the brake system 36. For example, the fluid backflow 32 may cause the second side 24 of the stop 20 to have a sticking engagement with the valve seat 28, which causes increased noise when the stop 20 moves from the closed position 90 to the open position 136.

Figure 14:
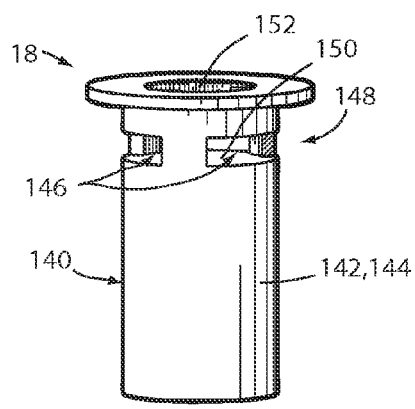
FIG. 14 is a top perspective view of an additional embodiment of a check valve.
Figure 15:
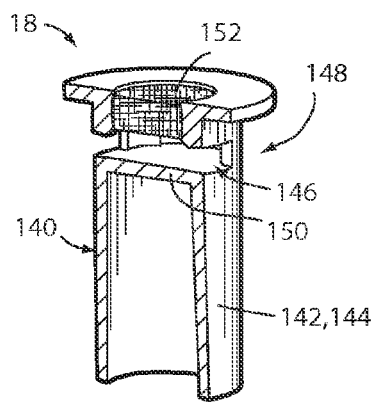
FIG. 15 is a cross-sectional top perspective view of the additional embodiment of the check valve.
Figure 16:
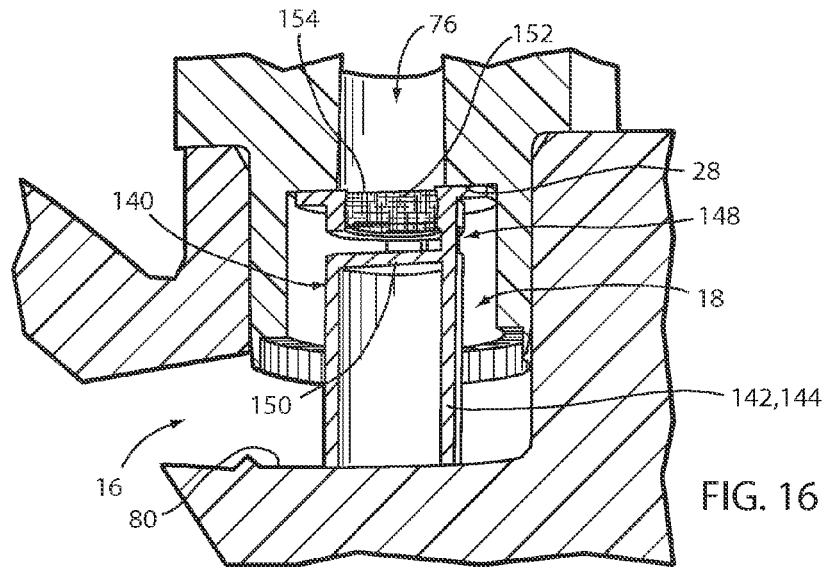
FIG. 16 is a cross-sectional bottom perspective view of the additional embodiment of the check valve disposed within the intake aperture that extends to the cylindrical chamber of the vacuum pump.

An additional embodiment of the check valve 18 is shown in FIGS. 14-16, omitting a stop 20 and a spring 26. In this embodiment, the check valve 18 comprises a porous body 140 with an elongated structural frame 142 that extends between the base surface 80 and the valve seat 28. A sidewall 144 of the elongated structural frame 142 similarly has a cylindrical shape and includes three side openings 146. The side openings 146 are formed at an elevated portion 148 of the sidewall 144 proximate the valve seat 28, requiring any fluid backflow 32 (FIG. 13) to migrate beyond the right angle between the intake aperture 16 and the conduit 76 and a considerable distance within the conduit 76. Further, a partition plate 150, as shown in FIGS. 15-16, divides the interior area bordered by the sidewall 144, immediately below the side openings 146. A metal foam 152 in this embodiment is spaced above the partition plate 150 and has a top surface 154 in approximate alignment with the valve seat 28. A flange 156 extends radially outward from an upper portion 158 of the sidewall 144 to abut the valve seat 28 and, thereby, retain the porous body 140 between the valve seat 28 and the base surface 80. The metal foam 152 similarly acts to prevent fluid backflow 32 that enters the side openings 146 from further migrating into the air line 78 or into the brake booster 46 (FIG. 1).

Figure 17:
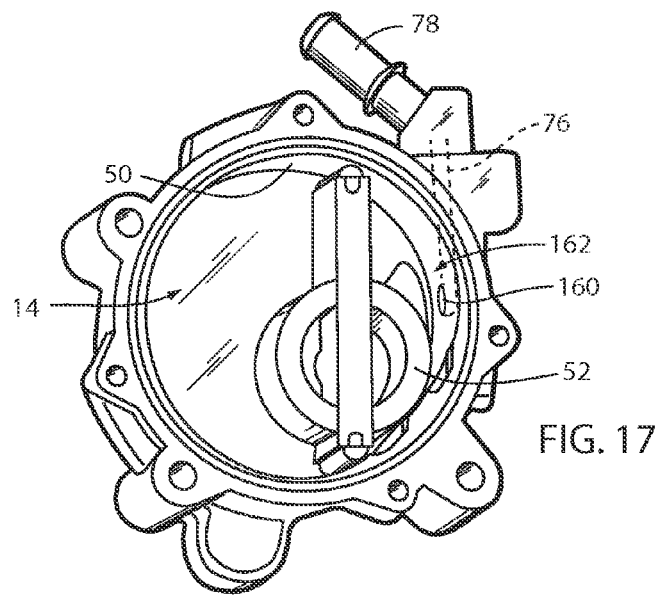
FIG. 17 is a bottom perspective view of an additional embodiment of a vacuum pump having a cylindrical chamber exposed and an alternative embodiment of an intake aperture illustrated.

As shown in FIG. 17, an additional embodiment of an intake aperture 160 is also illustrated. In this embodiment the intake aperture 160 is disposed on a lower portion 162 of the interior diameter 50 of the air chamber 14, in closer proximity to the rotor 52. Relocating the intake aperture 160 to the illustrated lower position results a stronger vacuum pressure to develop by rotation of the rotor 52. The stronger vacuum pressure causes an increased air flow into the air chamber 14 and reduces the chances of fluid backflow 32 from migrating into the intake aperture 160. This alternatively positioned intake aperture 160 may not include a check valve 18 coupled with the intake aperture 160 or it may be combined with either of the check valve 18 assemblies, or variations thereof, described above to further prevent fluid backflow 32 and to reduce noise caused by the intake air flow.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

We claim:

1. A check value of a rotary vane pump, comprising
a stop having first and second sides;
a helical spring engaging the first side and biasing the second side of the stop against a valve seat to a closed position;
a porous body disposed between the helical spring and an air chamber of the rotary vane pump, wherein the porous body includes a structural frame for rigidly supporting the spring away from the intake aperture, and wherein the structural frame surrounds a piece of metal foam and includes openings to allow air flow to enter the air chamber; and
a conduit extending orthogonally from an intake aperture of the rotary vane pump, the conduit defining an L-shape, wherein the porous body and the helical spring extended within the conduit and support the stop away from the intake aperture.

2. The check valve of claim 1, wherein the check valve is coupled between the intake aperture of the rotary vane pump and an air line extending to a vehicle brake booster, and wherein the fluid backflow includes oil within the air chamber that migrates in a reverse direction from air flow entering the intake aperture.

3. The check valve of claim 1, wherein the metal foam is configured to allow air flow to enter the air chamber and to prevent fluid from migrating to the stop.

4. The check valve of claim 1, wherein the conduit includes the valve seat protruding inward toward a central axis of the conduit to abut a periphery of the second side of the stop.

5. A check valve for a vacuum pump of a vehicle brake booster, comprising:
an elastomeric stop moveable between open and closed positions;
a spring biasing the elastomeric stop in the closed position against a valve seat to restrict air flow to an air chamber of the vacuum pump via an intake aperture; and
a porous body disposed between the elastomeric stop and the air chamber for preventing fluid backflow from migrating from the air chamber to the elastomeric stop;
wherein the porous body comprises a structural frame extending between the base surface and the spring for rigidly supporting the spring away from a base surface, the intake aperture comprises the base surface opposing the valve seat that supports the porous body, and the structural frame surrounds a piece of metal foam and includes openings to allow the air flow to enter the cylindrical chamber when the elastomeric stop is in the open position.

6. The check valve of claim 5, wherein the fluid backflow includes lubricant within the cylindrical chamber that migrates in a reverse direction from the air flow.

7. The check valve of claim 5, wherein the piece of metal foam in the porous body comprises an open-cell metal foam.

8. A check valve for an intake aperture of a vacuum pump, comprising;

a stop moveable between a closed position that obstructs the intake aperture and an open position that allows air flow to the vacuum pump;

a porous body for preventing fluid backflow to the stop, wherein the porous body includes a rigid frame having openings to allow the air flow to enter the vacuum pump and a piece of metal foam is disposed adjacent the openings; and a compression spring coupled between the stop and the porous body for biasing the stop in the closed position.

9. The check valve of claim 8, wherein the compression spring comprises a helical spring.

10. The check valve of claim 8, wherein the porous body is configured to allow the air flow to enter the vacuum pump from a vehicle brake booster and to prevent fluid backflow from migrating beyond the stop to the vehicle brake booster.

11. The check valve of claim 8, wherein the metal foam includes an open-cell structure with pores that are sized to allow the passage of air and to prevent the passage of liquid.

12. The check valve of claim 8, wherein the rigid frame includes a sidewall that surrounds the piece of metal foam and a top member that engages the compression spring, and wherein the openings extend through the sidewalls and the top member.

13. The check valve of claim 8, wherein the stop includes a first diameter and the porous body include a second diameter that is greater than the first diameter.

\* \* \* \* \*